(12) United States Patent
Faruque et al.

(10) Patent No.: US 12,351,007 B2
(45) Date of Patent: Jul. 8, 2025

(54) ACTUATOR MOVING DOOR-TRIM PANEL IN CROSS-VEHICLE DIRECTION

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 18/165,566

(22) Filed: Feb. 7, 2023

(65) Prior Publication Data
US 2024/0262172 A1 Aug. 8, 2024

(51) Int. Cl.
*B60J 5/04* (2006.01)

(52) U.S. Cl.
CPC ........... *B60J 5/0413* (2013.01); *B60J 5/0469* (2013.01)

(58) Field of Classification Search
None
See application file for complete search history.

(56) References Cited

U.S. PATENT DOCUMENTS

| | | | | |
|---|---|---|---|---|
| 5,447,326 | A * | 9/1995 | Laske | B60R 21/216 280/730.2 |
| 5,967,594 | A * | 10/1999 | Ramanujam | B60N 2/78 280/751 |
| 6,712,385 | B2 * | 3/2004 | Enders | B60R 21/206 280/752 |
| 7,537,268 | B2 | 5/2009 | Becker et al. | |
| 9,022,436 | B2 | 5/2015 | Wellborn, Sr. et al. | |
| 9,481,276 | B2 | 11/2016 | Faroo et al. | |
| 10,919,477 | B2 * | 2/2021 | Schnur | B60R 13/0243 |
| 2015/0360623 | A1 | 12/2015 | Larsen et al. | |

FOREIGN PATENT DOCUMENTS

| | | |
|---|---|---|
| CN | 208730905 U | 4/2019 |
| CN | 112026279 B | 7/2022 |
| DE | 102010005418 A1 | 7/2011 |
| WO | 2020193289 A1 | 10/2020 |

* cited by examiner

*Primary Examiner* — Joseph D. Pape
(74) *Attorney, Agent, or Firm* — Frank A. MacKenzie; Brooks Kushman P.C.

(57) ABSTRACT

An assembly includes a door panel. The assembly includes a door-trim panel movably supported by the door panel. The assembly includes an actuator between the door panel and the door-trim panel. The door-trim panel is selectively movable relative to the door panel in a cross-vehicle direction by the actuator.

20 Claims, 6 Drawing Sheets

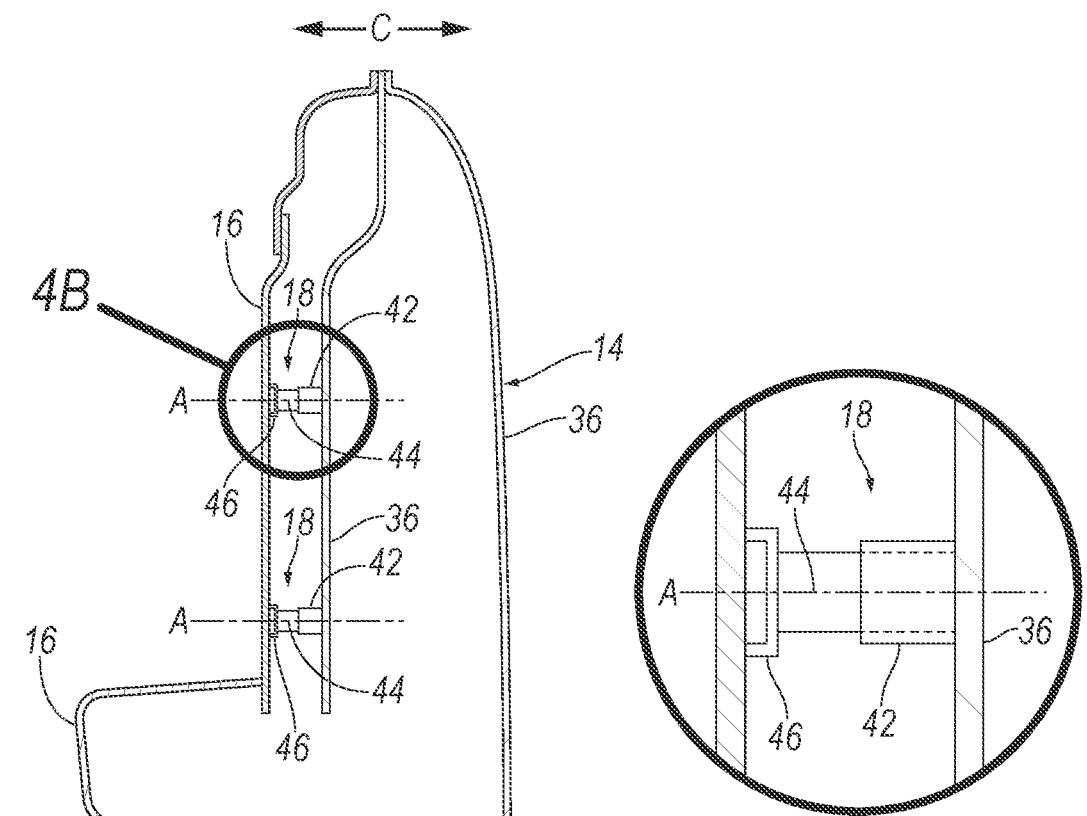
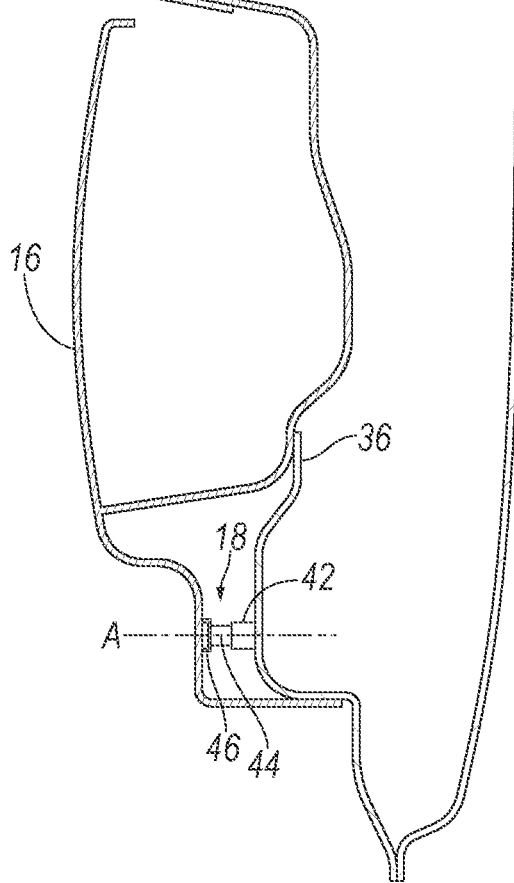
FIG. 4B
FIG. 4A

ACTUATOR MOVING DOOR-TRIM PANEL IN CROSS-VEHICLE DIRECTION

BACKGROUND

A vehicle door includes at least one door panel, e.g., an inner panel and an outer panel, and a door-trim panel mounted to the door panel. The door panel in some examples is metal, such as steel or aluminum and the door-trim panel faces a passenger compartment of the vehicle. The door-trim panel can be aligned with the vehicle occupant seated next to the vehicle door. During certain side impacts, the door-trim panel may be designed to interact with the occupant for impact energy management.

BRIEF DESCRIPTION OF THE DRAWINGS

FIG. 4A is a cross-sectional view through line 4 of FIG. 2 with the door-trim panel in a first position.

FIG. 4B is a side view of an actuator between the door-trim panel and a door panel.

DETAILED DESCRIPTION

Figure 1:
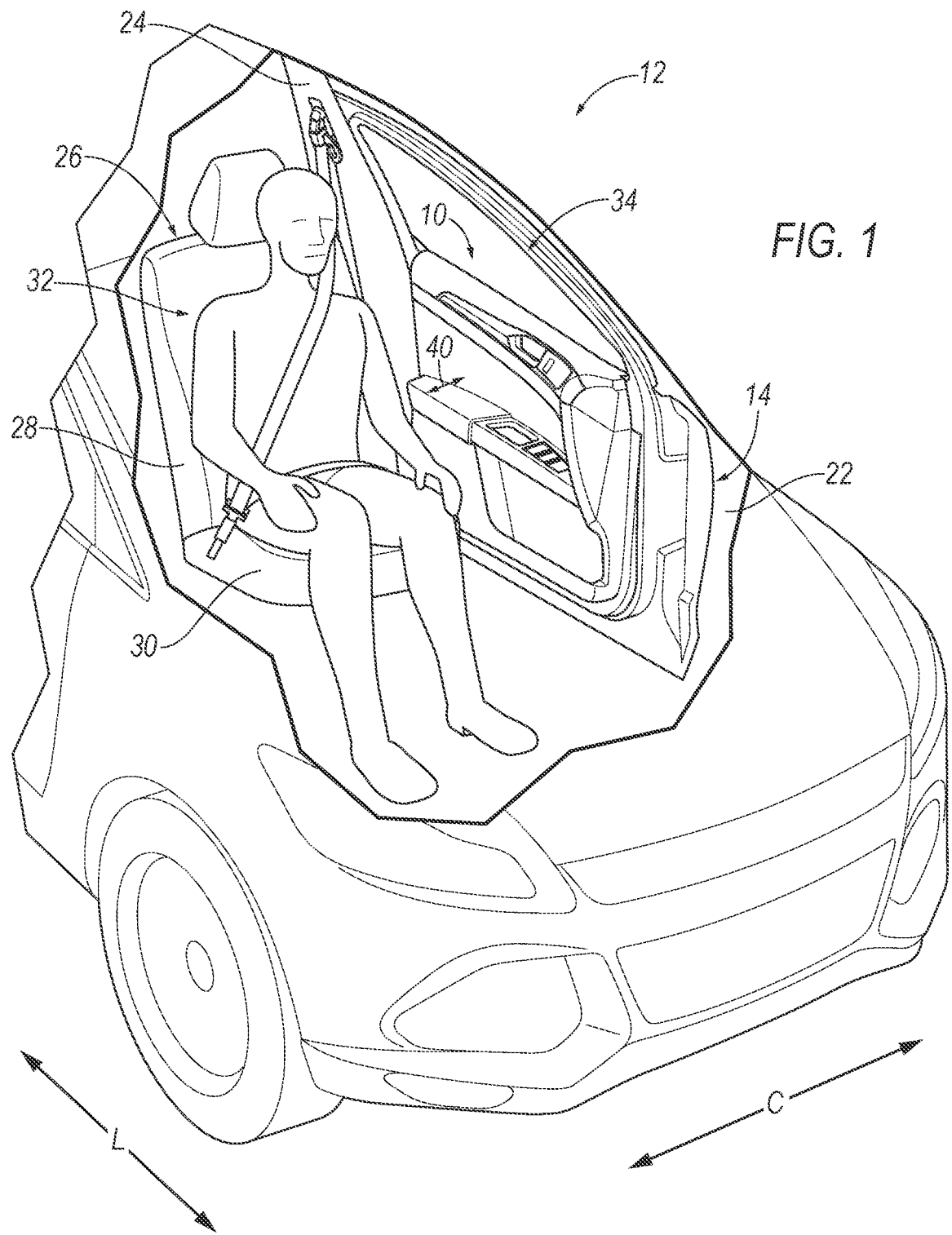
FIG. 1 is a perspective view of an occupant seated adjacent a door-trim panel of a vehicle.

An assembly includes a door panel. The assembly includes a door-trim panel movably supported by the door panel. The assembly includes an actuator between the door panel and the door-trim panel. The door-trim panel is selectively movable relative to the door panel in a cross-vehicle direction by the actuator.

The assembly may include a support plate fixed relative to the door-trim panel and the actuator, the actuator abutting the support plate.

The support plate may be fixed to the door-trim panel between the door-trim panel and the actuator.

The assembly may include a second actuator between the door panel and the door-trim panel. The second actuator may be spaced from the actuator. The door-trim panel may be selectively movable relative to the door panel in the cross-vehicle direction by the second actuator.

The actuator may include a housing fixed relative to the door panel and a plunger movable relative to the housing.

The assembly may include a support plate fixed relative to the door-trim panel and the actuator. The plunger of the actuator may abut the support plate.

The plunger may be fixed to the support plate.

The plunger may be movable along the cross-vehicle direction.

The actuator may be fixed relative to the door panel and the door-trim panel.

The door-trim panel may be vehicle-inboard of the door panel.

The door-trim panel may be vehicle-inboard of the actuator.

The assembly may include a seat adjacent the door-trim panel. The door-trim panel may be between the door panel and the seat.

The door-trim panel may be movable relative to the seat. The door-trim panel may be movable toward and away from the seat by the actuator.

The assembly may include a computer including a processor and a memory storing instructions executable by the processor to identify a size of an occupant of a vehicle seat adjacent the door-trim panel and activate the actuator to move the door-trim panel in the cross-vehicle direction based on the identified size of the occupant of the vehicle seat.

The memory may store instructions executable by the processor to determine a gap between the occupant and the door-trim panel based on the size of the occupant and wherein activating the actuator includes to move to the door-trim panel to a position corresponding to the determined gap.

The assembly may include an occupant sensor. The memory may store instructions executable by the processor to identify a size of an occupant includes the occupant sensor sending a signal identifying the size of the occupant.

With reference to the Figures, wherein like numerals indicate like parts throughout the several views, an assembly 10 for a vehicle 12 includes a door panel 14. The assembly 10 includes a door-trim panel 16 movably supported by the door panel 14. The assembly 10 includes an actuator 18 between the door panel 14 and the door-trim panel 16. The door-trim panel 16 is selectively movable relative to the door panel 14 in a cross-vehicle direction C by the actuator 18.

The actuator 18 may move the door-trim panel 16 in the cross-vehicle direction C to move the door-trim panel 16 toward or away from the occupant of the vehicle 12. The actuator 18 may move the door-trim panel 16 into a position of comfort for the occupant and to a position where the door-trim panel 16 may control the kinematics of the occupant in the event of certain side impacts to the vehicle 12. The actuator 18 may move the door-trim panel 16 based on certain criteria in the vehicle 12 as described further below.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 may include a vehicle body (not numbered). The vehicle body includes body panels, e.g., the door panel 14, partially defining an exterior of the vehicle 12. The body panels may present a class-A surface, e.g., a finished surface exposed to view by a customer and free of unaesthetic blemishes and defects. The body panels include, e.g., a vehicle roof (not numbered), a vehicle floor 20, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body may include pillars 22, 24. The vehicle body may include any suitable number of pillars 22, 24. For example, the vehicle body may include a front pillar 22, a middle pillar 24, and rear pillar (not shown) on each side of the vehicle 12. The front pillar 22 may be disposed at the front end of the passenger compartment. The middle pillars 24 may be spaced from the front pillars 22 by a front door opening (not numbered). The rear pillars may be spaced from the middle pillars 24 by a rear door opening (not numbered). The pillars 22, 24 may extend from the vehicle roof to the vehicle floor 20.

With continued reference to FIG. 1, the vehicle 12 may include one or more seats 26. Specifically, the vehicle 12 may include any suitable number of seats 26. As shown in FIG. 1, the seats 26 are supported by the vehicle floor 20. The seats 26 may be arranged in any suitable arrangement in the passenger compartment. As in the example shown in the Figures, one or more of the seats 26 may be at the front end of the passenger compartment, e.g., a driver seat and/or a passenger seat. In other examples, one or more of the seats 26 may be behind the front end of the passenger compartment, e.g., at the rear end of the passenger compartment. The seats 26 may be movable relative to the vehicle floor 20 to various positions, e.g., movable fore-and-aft and/or cross-vehicle. The seat 26 may be of any suitable type, e.g., a bucket seat.

The seat 26 includes the seatback 28 and a seat bottom 30. The seatback 28 may be supported by the seat bottom 30 and may be stationary or movable relative to the seat bottom 30. The seatback 28 and the seat bottom 30 may be adjustable in multiple degrees of freedom. Specifically, the seatback 28 and the seat bottom 30 may themselves be adjustable. In other words, adjustable components within the seatback 28 and/or the seat bottom 30, and/or may be adjustable relative to each other.

The seat 26, specifically the seatback 28 and the seat bottom 30, defines an occupant seating area 32. The occupant seating area 32 is the area occupied by an occupant when properly seated on the seat bottom 30 and the seatback 28. The occupant seating area 32 is in a seat-forward direction of the seatback 28 and above the seat bottom 30. In the example shown in the Figures, the occupant seating area 32 faces the front end of the passenger compartment.

The vehicle 12 includes a plurality of doors 34 openable for vehicle occupants to enter and exit a passenger compartment. The doors 34 may be openable between a closed position and an open position. On each side of the vehicle 12, the vehicle 12 includes a front door spaced along a vehicle-longitudinal axis L from a rear door. Each of the doors 34 are adjacent a seat 26 in the vehicle 12. Each of the front seats and each of the rear seats may be adjacent a door 34 of the vehicle 12. Specifically, each front seat may be adjacent a front door and each rear seat may be adjacent a rear door. The doors 34 are vehicle-outboard from each of the front seats and each of the rear seats. The vehicle 12 includes pillars 22, 24 adjacent the doors 34. The vehicle 12 includes a pillar in front of the front door, e.g., the front pillar 22. The vehicle 12 includes a pillar between the front door and the rear door on each side of the vehicle 12, e.g., the middle pillar 24.

Roof rails (not numbered) of the vehicle 12 may contact a top edge (not numbered) of the doors 34 when the doors 34 are in the closed position. Each door 34 includes at least one door panel 14 and the door-trim panel 16 supported on the door panel 14. Specifically, and as further described below, the door-trim panel 16 is moveably supported by the door panel 14. The door 34 may include two panels, namely a door inner 36 and a door outer 38. In such an example, the door-trim panel 16 and the door outer 38 are fixed to the door inner 36. The door-trim panel 16 is positioned opposite the door outer 38. The door-trim panel 16 is vehicle-inboard of the door panel 14. Specifically, the door-trim panel 16 is vehicle-inboard relative to the door inner 36 and the door outer 38 is outboard relative to the door inner 36. The door-trim panel 16 of each of the doors 34 is adjacent each of the seats 26. The door-trim panels 16 are between the seats 26 and the door panels 14. The door 34 includes a window opening (not numbered) that may be completely closed by a window (not numbered) when the window is in a fully raised position. The window opening may be defined by the door-trim panel 16 and the door panel 14 on a bottom edge and either the door panel 14 or the vehicle body may circumscribe the window opening.

The door outer 38 may define a portion of the exterior of the vehicle 12. For example, the door outer 38 may present a class-A surface along the exterior of the vehicle 12, i.e., a surface specifically manufactured to have a high-quality, finished aesthetic appearance free of blemishes. The door outer 38 may be metal (such as steel, aluminum, etc.) or polymeric (such as fiber reinforced plastic composite, etc.).

The door inner 36 may be metal (such as steel, aluminum, etc.) or polymeric (such as fiber reinforced plastic composite, etc.). The door inner 36 may provide structural rigidity for the door outer 38. The door inner 36 may provide a mounting location for other components of the vehicle 12, e.g., switches, lights, etc. The door-trim panel 16 may be a material suitable for an interior of the vehicle 12, such as vinyl, plastic, leather, wood, etc.

With reference to FIGS. 2-4C, as discussed above, the door-trim panel 16 is movably supported by the door panel 14. In other words, the door-trim panel 16 may move relative to the door panel 14. The door-trim panel 16 is movable in a cross-vehicle direction C relative to the door panel 14. The door-trim panel 16 is movable along the cross-vehicle direction C to change the distance between the seat 26 and the door-trim panel 16. In other words, the door-trim panel 16 is movable along the cross-vehicle direction C to change the distance between the occupant seating area 32 and the door-trim panel 16. The door-trim panel 16 is movable toward and away from the seat 26 adjacent the door 34. The door-trim panel 16 may move toward or away from the occupant seating area 32 of the seat 26 adjacent the door 34. Specifically, the door-trim panel 16 may move toward or away from an occupant seated in the occupant seating area 32.

The door-trim panel 16 is selectively movable relative to the door panel 14. In other words, the door-trim panel 16 is movable based on certain criteria in the vehicle 12. For example, as in the example in the Figures, the door-trim panel 16 moves based on the size of the occupant of the vehicle 12. As discussed further below, sensors, e.g., an occupant sensor 52, in the vehicle 12 may 12 may identify a size of an occupant, e.g., weight, height, etc., to selectively determine when and the position to which to move the door-trim panel 16. The size of the occupant may correspond to a gap 40 between the occupant and the door-trim panel 16. The gap 40 changes based on the size of the occupant. For example, for a smaller occupant, the gap 40 may be larger and for a larger occupant, the gap 40 may be smaller. The gap 40 may be designed to move the door-trim panel 16 into a position to control the kinematics of the occupant in the event of certain side impacts to the vehicle 12. For example, the door-trim panel 16 may absorb energy from certain side impacts to the vehicle 12. The gap 40 may be designed to move the door-trim panel 16 to a position of comfort for the occupant of the vehicle 12 based on the size of occupant. The door-trim panel 16 may be moved to a position based on the gap 40 identified based on the size of the occupant.

The door-trim panel 16 is movable relative to the seat 26 adjacent the door 34. For example, when the occupant is identified as a smaller occupant, e.g., lower weight, height, etc., the door-trim panel 16 may move toward the seat 26 and when the occupant is determined as a larger occupant, e.g., higher weight, height, etc., the door-trim panel 16 may move away from the seat 26. In other examples, other criteria, e.g., seat location, to determine when and where to which the door-trim is moved relative to the seat 26. Depending on the gap 40 corresponding to the size of the occupant and the current position of the door-trim panel 16, the door-trim panel 16 may move toward the occupant of the seat 26 or away from the occupant of the seat 26.

Figure 4C:
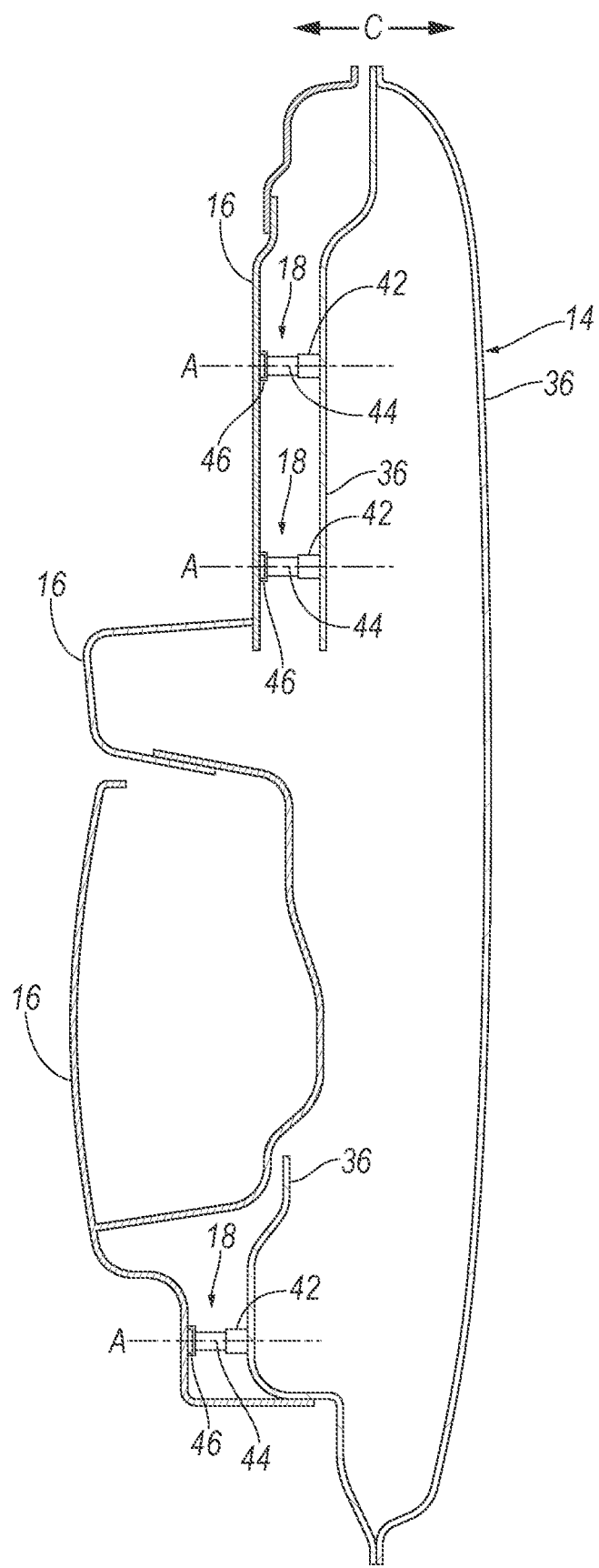
FIG. 4C is a cross-sectional view through line 4 of FIG. 2 with the door-trim panel in a second position.

The door-trim panel 16 is movable to different positions along the cross-vehicle direction C, including a first position and a second position different from the first position. The positions may be based on the size as discussed above. In other words, the positions correspond to the size of the occupant of the seat 26. In some examples, the door-trim panel 16 may be movable to a plurality of discrete positions and in other examples the movement may be infinite between two end positions. An example of the first position is shown in FIG. 4B and an example of the second position is shown in FIG. 4C. The first and second positions shown in FIGS. 4B-4C are shown merely by way of example to illustrate two different positions. In the example shown in the Figures, the first position may be a starting position for the door-trim panel 16 and the second position may be a position the door-trim panel 16 moves toward to provide the gap 40 between the door-trim panel 16 and the occupant of seat 26 based on the size of the occupant.

With reference to FIGS. 4A-4C, the assembly 10 includes one or more actuators 18 between the door panel 14 and the door-trim panel 16. The door-trim panel 16 is vehicle-inboard of the actuator 18 and the door panel 14 is vehicle-outboard of the actuator 18. In the example shown in the Figures, the assembly 10 includes six actuators 18 between the door panel 14 and the door-trim panel 16. The actuators 18 may be spaced from each other at different locations between the door panel 14 and the door-trim panel 16. Depending on the size of the door-trim panel 16 or the structure of the door-trim panel 16 and the door panel 14, the number of actuators 18 and location of the actuators 18 may change. The assembly 10 may include any suitable number of actuators 18 between the door panel 14 and the door-trim panel 16.

The door-trim panel 16 is movable relative to the door panel 14 by the actuators 18. Specifically, the door-trim panel 16 is selectively movable relative to the door panel 14 by the actuators 18. The actuators 18 may move the door-trim panel 16 from the first position to the second position or any other position between the first and second positions. The door-trim panel 16 moves in the cross-vehicle direction C by the actuators 18 toward or away from the seats 26 based on criteria identified in the vehicle 12. The actuators 18 are activated based on the criteria identified, e.g., the size of the occupant, to move the door-trim panel 16 toward or away from the seat 26. In other words, the door-trim panel 16 is moveable toward and away from the seat 26 by the actuators 18. The actuators 18 move the door-trim panel 16 to the position corresponding to the identified gap 40 between the occupant and the door-trim panel 16 based on the size of the occupant of the seat 26.

With continued reference to FIGS. 4A-4C, the actuators 18 are fixed relative to the door panel 14 and the door-trim panel 16. Specifically, in the example shown in the Figures, the actuators 18 include a housing 42 fixed relative to the door panel 14 and a plunger 44 that is movable relative to the housing 42. The housing 42 of the actuators 18 may be fixed to one of the door panel 14 or the door-trim panel 16 and the plunger 44 may abut, either directly or indirectly, the other of the door panel 14 or the door-trim panel 16. In the example shown in the Figures, the actuators 18 are fixed to the door panel 14. Specifically, the actuators 18 are fixed to the door inner 36. In such an example, the housing 42 of the actuators 18 are fixed to the door inner 36 and the plungers 44 abut the door-trim panel 16. In other examples, the actuators 18 may be fixed to the door-trim panel 16. In such an example, the housing 42 of the actuators 18 are fixed to the door-trim panel 16 and the plungers 44 abut the door inner 36 of the door panel 14. The housing 42 may be fixed in any suitable way to allow the door-trim panel 16 to move relative to the door panel 14 both toward and away from the seat 26. For example, the housing 42 may be fixed by fasteners, welding, etc.

The plungers 44 of the actuators 18 are movable along an axis A that extends along the cross-vehicle direction C. In other words, the plungers 44 are movable along the cross-vehicle direction C. The plungers 44 may be movable into and out of the housing 42 of the actuator 18 to move in the cross-vehicle direction C and along the axis A. As discussed above, the plungers 44 may abut, either directly or indirectly, the door panel 14 or the door-trim panel 16. Directly means that the plunger 44 abuts the door panel 14 or door-trim panel 16 with no other components between the door panel 14 or the door-trim panel 16 and the plunger 44. Indirectly means other components may be between the door panel 14 or door-trim panel 16 and the plunger 44. When the actuator 18 is activated, the plungers 44 move relative to the housings 42 to move the door-trim panel 16 from the first position to the second position. In other words, the movement of the plungers 44 along the cross-vehicle direction C pushes the door-trim panel 16 away from the door panel 14, specifically, the door inner 36, or pulls the door-trim panel 16 toward the door inner 36, depending on the position of the second position relative to the first position.

Figure 2:
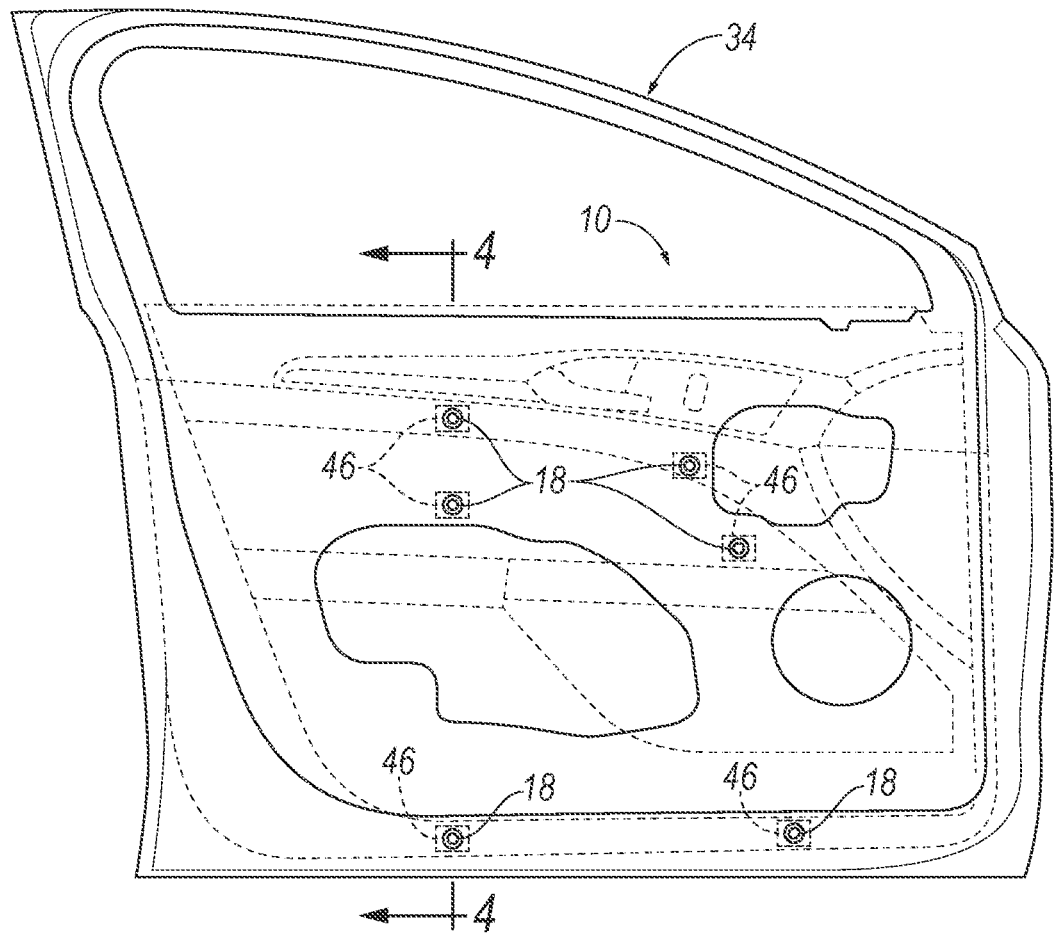
FIG. 2 is a frontal view of the door-trim panel of the vehicle.
Figure 3:
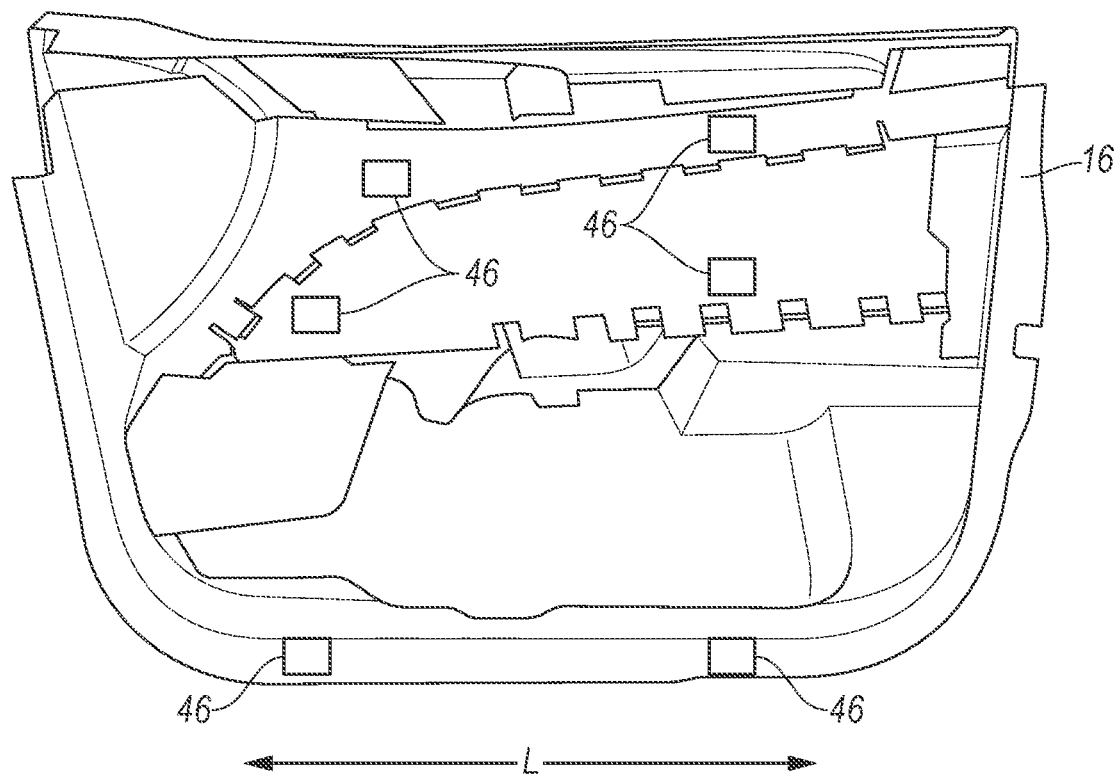
FIG. 3 is a rear view of the door-trim panel of the vehicle.

With reference to FIGS. 2 and 3, one or more support plates 46 may be fixed relative to the door-trim panel 16 and the actuator 18. Specifically, the support plates 46 fixed between the door-trim panel 16 and the actuator 18. The support plates 46 are fixed to one of the door-trim panel 16 or the door panel 14. Specifically, the support plates 46 are fixed to one of the door-trim panel 16 or the door inner 36. In some examples, as shown in the Figures, the support plates 46 may be fixed to the door-trim panel 16 and the actuators 18 may be fixed to the door panel 14. In such an example, the support plates 46 are fixed to the door-trim panel 16 between the door-trim panel 16 and the actuators 18. In other examples, the support plates 46 may be fixed to the door panel 14 and the actuators 18 may be fixed to the door 34 trim panel. In other words, in both examples, the support plates 46 are fixed opposite of the actuators 18. In such an example, the support plates 46 are fixed to the door panel 14 between the door panel 14 and the actuators 18. For example, if the actuators 18 are fixed to the door panel 14, the support plates 46 are fixed to the door-trim panel 16 and if the actuators 18 are fixed to the door-trim panel 16, the support plates 46 are fixed to the door panel 14.

The actuators 18 may abut the support plates 46. Specifically, the plungers 44 of the actuators 18 may abut the support plates 46. The plungers 44 may abut the support plates 46 in the first position and in the second position. The plungers 44 remains in contact with the support plates 46 as the door-trim panel 16 moves between the first position and the second position. In other words, the plungers 44 may be connected to the support plates 46. For example, the plungers 44 may be fixed to the support plates 46 to move the door-trim panel 16 between the first position and the second position. The plungers 44 may be fixed to the support plates 46 in any suitable way, e.g., fasteners, a slot, etc.

The assembly 10 may include any suitable number of support plates 46. Specifically, the number of support plates 46 may correspond to the number of actuators 18. For example, as shown in the example shown in the Figures, the assembly 10 includes six actuators 18 as described above, and the assembly 10 includes six support plates 46. The support plates 46 are aligned with the actuators 18 such that the plungers 44 may contact the support plates 46 to move the door-trim panel 16 from the first position to the second position.

The actuator 18 may be of any suitable type of actuator 18. For example, the actuator 18 may be of an electro-mechanical screw type actuator, a hydraulic actuator, a Piezo-electric actuator, a pneumatic actuator, etc. In each of the above listed examples, the plunger 44 may be moved in different ways depending on the type of actuator 18.

Figure 5:
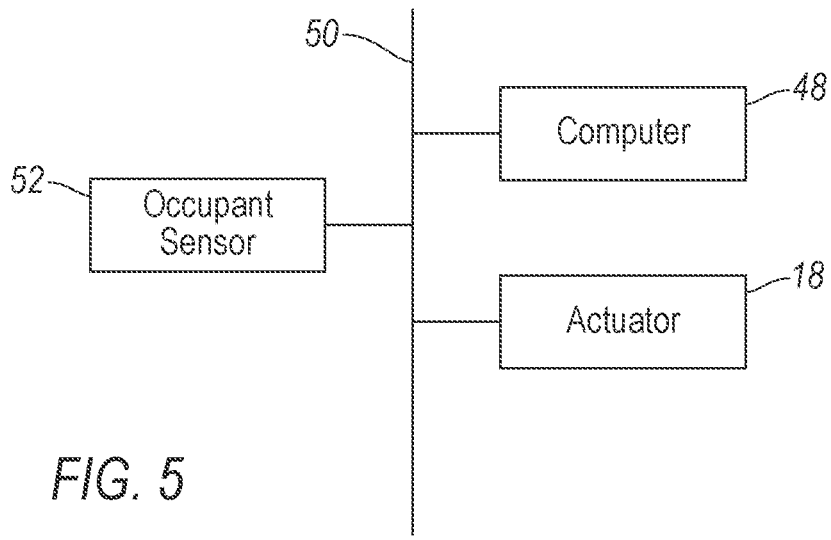
FIG. 5 is a block diagram of a vehicle communication network of the vehicle.
Figure 6:
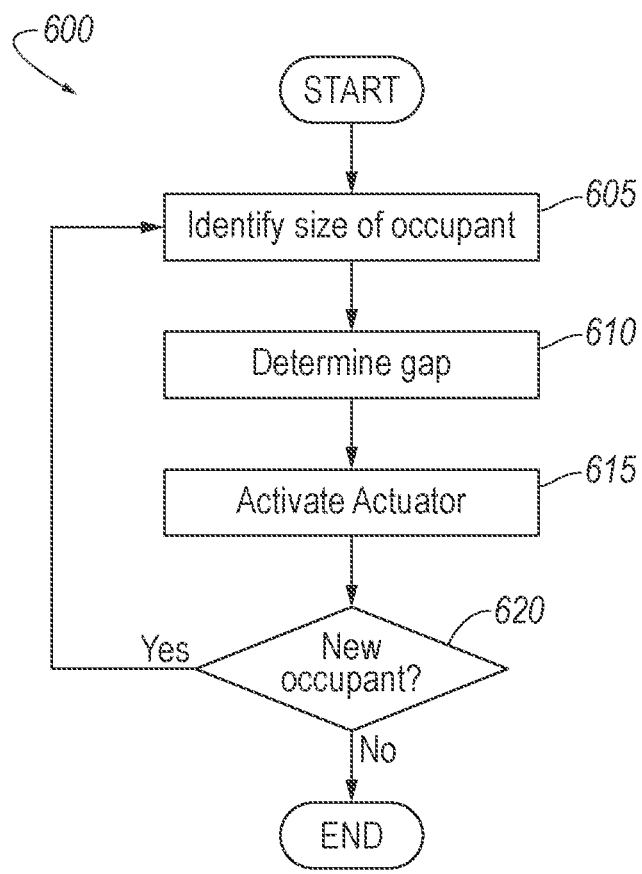
FIG. 6 is a flowchart of a method executable by a vehicle computer to move the door-trim panel from the first position to the second position.

With reference to FIGS. 5 and 6, the vehicle computer 48 includes a processor and a memory storing instructions executable by the processor. The memory includes one or more forms of computer readable media, and stores instructions executable by the vehicle computer 48 for performing various operations, including as disclosed herein. The vehicle computer 48 may be a restraint control module. The vehicle computer 48 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 48 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

With reference to FIG. 5, the vehicle computer 48 is generally arranged for communications on a vehicle communication network 50 that can include a bus in the vehicle 12 such as a controller area network CAN or the like, and/or other wired and/or wireless mechanisms. Alternatively or additionally, in cases where the vehicle computer 48 actually comprises a plurality of devices, the vehicle communication network 50 may be used for communications between devices represented as the vehicle computer 48 in this disclosure. Further, as mentioned below, various controllers and/or sensors may provide data to the vehicle computer 48 via the vehicle communication network 50.

The vehicle 12 may include one or more occupant sensors 52 inside the passenger compartment. The occupant sensors 52 may be in communication with the vehicle computer 48 to identify an occupant of one or more of the seats 26 of the vehicle 12. For example, the occupant sensor 52 may send a signal to the vehicle computer 48 to identify an occupant is seated in a seat 26 of the vehicle 12. The occupant sensor 52 may determine certain criteria about the occupant of the vehicle 12. For example, the occupant sensor 52 may identify the size of the occupant of the vehicle 12, e.g., weight of the occupant, height of the occupant, seat location, etc. In other examples, the occupant sensor 52 may identify other criteria about the occupant of the vehicle 12. The occupant sensor 52 may be any suitable type of sensor in the vehicle 12 that identifies the size of the occupant, e.g., a weight sensor, a camera, a proximity sensor between the door-trim panel 16 and the occupant, a seat position sensor, etc.

With reference to FIG. 6, the vehicle computer 48 stores instructions to control components of the vehicle 12 according to the method 600. Specifically, as shown in FIG. 6, the method 600 includes moving the door-trim panel 16 from a first position to a second position corresponding to the size of the occupant seated in the seat 26. Use of "based on" herein indicates a causal relationship, not merely a temporal relationship.

With reference to block 605, the method 600 includes to identify a size of the occupant of the seat 26 adjacent the door-trim panel 16. Identifying the size of the occupant may include the occupant sensor 52 sending a signal to the vehicle computer 48 to identify the size of the occupant. The size of the occupant may include a weight of the occupant or other measurement of the size of the occupant that is transmitted to the vehicle computer 48 to be used in block 610.

With reference to block 610, based on the size of the occupant of the seat 26, the method 600 includes to determine the gap 40 between the occupant and the door-trim panel 16. The gap 40 between the occupant and the door-trim panel 16 may correspond to predetermined measurements stored within the vehicle computer 48 that correspond to sizes of the occupant of the seat 26 as determined in block 615.

With reference to block 615, based on the size of the gap 40 determined in block 610, the method 600 includes to activate the actuator 18 to move the door-trim panel 16 in the cross-vehicle direction C. The actuator 18 moves the door-trim panel 16 from the first position to the second position, i.e., a position corresponding to the determined gap 40 between the door-trim panel 16 and the seat 26. The plunger 44 may move away from or toward the door panel 14 to move the door-trim panel 16 to the second position. The method 600 may return to block 605

With reference to decision block 620, the method 600 includes to identify if a new occupant is seated in the seat 26. The occupant sensor 52 may identify a new occupant is seated in the seat 26. If a new occupant is seated in the seat 26, the method 600 returns to block 610 to identify the size of the occupant. If no new occupant is seated in the seat 26, the method 600 ends.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a door panel;
   a door-trim panel movably supported by the door panel;
   an actuator between the door panel and the door-trim panel, the door-trim panel being selectively movable relative to the door panel in a cross-vehicle direction by the actuator; and
   a computer including a processor and a memory storing instructions executable by the processor to:
      identify a size of an occupant of a vehicle seat adjacent the door-trim panel; and
      activate the actuator to move the door-trim panel in the cross-vehicle direction based on the identified size of the occupant of the vehicle seat.

2. The assembly of claim 1, further comprising a support plate fixed relative to the door-trim panel and the actuator, the actuator abutting the support plate.

3. The assembly of claim 2, wherein the support plate is fixed to the door-trim panel between the door-trim panel and the actuator.

4. The assembly of claim 1, further comprising a second actuator between the door panel and the door-trim panel, the second actuator being spaced from the actuator, and the door-trim panel being selectively movable relative to the door panel in the cross-vehicle direction by the second actuator.

5. The assembly of claim 1, wherein the actuator includes a housing fixed relative to the door panel and a plunger movable relative to the housing.

6. The assembly of claim 5, further comprising a support plate fixed relative to the door-trim panel and the actuator, the plunger of the actuator abutting the support plate.

7. The assembly of claim 6, wherein the plunger is fixed to the support plate.

8. The assembly of claim 5, wherein the plunger is movable along the cross-vehicle direction.

9. The assembly of claim 1, wherein the actuator is fixed relative to the door panel and the door-trim panel.

10. The assembly of claim 1, wherein the door-trim panel is vehicle-inboard of the door panel.

11. The assembly of claim 1, wherein the door-trim panel is vehicle-inboard of the actuator.

12. The assembly of claim 1, further comprising a seat adjacent the door-trim panel, the door-trim panel being between the door panel and the seat.

13. The assembly of claim 12, wherein the door-trim panel is movable relative to the seat, the door-trim panel being movable toward and away from the seat by the actuator.

14. The assembly of claim 1, wherein the memory stores instructions executable by the processor to:
   determine a gap between the occupant and the door-trim panel based on the size of the occupant; and
   wherein activating the actuator includes to move the door-trim panel to a position corresponding to the determined gap.

15. The assembly of claim 1, further comprising an occupant sensor, wherein the instructions to identify a size of an occupant include receiving a signal from the occupant sensor identifying the size of the occupant.

16. An assembly comprising:
   a door panel;
   a door-trim panel movably supported by the door panel;
   an actuator between the door panel and the door-trim panel, the door-trim panel being selectively movable relative to the door panel in a cross-vehicle direction by the actuator;
   the actuator including a housing fixed relative to the door panel and a plunger movable relative to the housing; and
   a support plate fixed relative to the door-trim panel and the actuator, the plunger of the actuator abutting the support plate.

17. The assembly of claim 16, wherein the plunger is fixed to the support plate.

18. The assembly of claim 16, wherein the plunger is movable along the cross-vehicle direction.

19. The assembly of claim 16, wherein the actuator is fixed relative to the door panel and the door-trim panel.

20. The assembly of claim 16, further comprising a second actuator between the door panel and the door-trim panel, the second actuator being spaced from the actuator, and the door-trim panel being selectively movable relative to the door panel in the cross-vehicle direction by the second actuator.

\* \* \* \* \*